US010522979B1

(12) United States Patent
Parkerson

(10) Patent No.: US 10,522,979 B1
(45) Date of Patent: Dec. 31, 2019

(54) BUS BAR ASSEMBLIES, POWER DISTRIBUTION SYSTEMS, AND METHODS

(71) Applicant: Siemens Industry, Inc., Alpharetta, GA (US)

(72) Inventor: Jason Parkerson, Mansfield, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/118,095

(22) Filed: Aug. 30, 2018

(51) Int. Cl.
*H02B 1/20* (2006.01)
*H02B 3/00* (2006.01)

(52) U.S. Cl.
CPC ............... *H02B 1/20* (2013.01); *H02B 3/00* (2013.01)

(58) Field of Classification Search
None
See application file for complete search history.

(56) References Cited

U.S. PATENT DOCUMENTS

| | | | | |
|---|---|---|---|---|
| 5,785,542 A * | 7/1998 | Johnson | ............... | H01R 25/162 439/210 |
| 6,040,976 A | 3/2000 | Bruner et al. | | |
| 6,111,745 A | 8/2000 | Wilkie et al. | | |
| 6,169,248 B1 | 1/2001 | Rowe et al. | | |
| 6,435,888 B1 * | 8/2002 | Reed, Jr. | .................. | H01R 4/30 174/88 B |
| 6,603,075 B1 * | 8/2003 | Soares | ..................... | H02B 1/21 174/149 B |
| 6,781,818 B2 * | 8/2004 | Josten | ...................... | H02B 1/21 174/149 B |
| 6,888,066 B1 * | 5/2005 | Wiant | ...................... | H02B 1/21 174/68.2 |
| 7,075,021 B2 | 7/2006 | Rowe et al. | | |
| 7,334,315 B2 | 2/2008 | Wiant et al. | | |
| 7,449,635 B2 | 11/2008 | Wiant | | |
| 8,437,118 B2 | 5/2013 | Kasza et al. | | |
| 8,512,057 B2 * | 8/2013 | Haar | ...................... | H02G 5/007 439/212 |
| 8,550,830 B1 * | 10/2013 | Bhathija | ................ | H01R 31/02 439/213 |
| 8,717,741 B2 | 5/2014 | Valenzuela | | |
| 9,144,161 B2 | 9/2015 | Kozuru et al. | | |
| 9,236,724 B2 * | 1/2016 | Nohara | ............... | H01H 85/044 |
| 9,391,413 B2 | 7/2016 | Blasbalg et al. | | |
| 9,590,405 B1 * | 3/2017 | Maurer | ................ | H01R 25/145 |
| 9,608,413 B2 | 3/2017 | Kubota et al. | | |
| 9,622,374 B2 | 4/2017 | Bhattacharya et al. | | |
| 9,705,294 B2 | 7/2017 | Kubota et al. | | |
| 9,705,299 B1 * | 7/2017 | Maurer | .................. | H02G 5/007 |
| 2010/0051342 A1 | 3/2010 | Diaz | | |

* cited by examiner

*Primary Examiner* — Xanthia C Cunningham

(57) ABSTRACT

A bus bar assembly includes a first rail assembly including a first end and an adjacent first main body and a second rail assembly including a second end and an adjacent second main body. A splice splices the first end to the second end. The splice includes an outer plate wherein a portion of the outer plate is adjacent the first main body and a portion of the outer plate adjacent the second main body. The splice includes one or more inner plates, each having two or more extension tabs, wherein a first extension tab is adjacent the first rail assembly and a second extension tab is adjacent the second rail assembly. Power distribution system and methods of splicing are also disclosed.

17 Claims, 7 Drawing Sheets

BUS BAR ASSEMBLIES, POWER DISTRIBUTION SYSTEMS, AND METHODS

FIELD

The present disclosure relates to assemblies, systems, and methods for electrical power distribution, and specifically to splice joints in power distribution systems.

BACKGROUND

Power distribution systems (e.g., switchgear and switchboard systems) may include bus bars that conduct current into, out of, and throughout the power distribution systems. Splices (e.g., splice joints) electrically and mechanically connect different segments of bus bars together. The splice joints are difficult to access and assemble in compact power distribution systems. Some splices may be points of reduced cross-sectional area in the bus bars, which reduces the current carrying capacity of the bus bars.

There is a need for improvements to various splices between bus bars in power distribution systems.

SUMMARY

According to a first aspect, a bus bar assembly is provided. The bus bar assembly includes a first rail assembly having a first end and an adjacent first main body, the first main body having a first outer shape; and a second rail assembly having a second end and an adjacent second main body, the second main body having a second outer shape. A first splice splices the first end to the second end, the first splice comprises: a first outer plate having a shape that at least partially matches the first outer shape and the second outer shape, a portion of the first outer plate adjacent the first main body and a portion of the outer plate adjacent the second main body; and one or more inner plates, each of the one or more inner plates having two or more extension tabs, wherein a first extension tab is adjacent the first rail assembly and a second extension tab is adjacent the second rail assembly.

According to another aspect, a power distribution system is provided. The power distribution system includes a bus comprising one or more bus bars configured to conduct current within the power distribution system, one or more of the bus bars comprising: a first rail assembly having a first end and an adjacent first main body, the first main body having a first outer shape; a second rail assembly having a second end and an adjacent second main body, the second main body having a second outer shape; a first splice splicing the first end to the second end, the first splice comprising: an outer plate having a shape that at least partially matches the first outer shape and the second outer shape, a portion of the outer plate adjacent the first main body and a portion of the outer plate adjacent the second main body; and one or more inner plates, each of the one or more inner plates having two or more extension tabs, a first extension tab adjacent the first rail assembly and a second extension tab adjacent the second rail assembly.

According to another aspect, a method of splicing a first rail assembly of a first bus bar to a second rail assembly of a second bus bar is provided. The method includes providing a first rail assembly including a main body and a first end, the main body including a first connector and a first portion extending from the first connector, the first end being devoid of the first portion; providing a second rail assembly including a main body and a second end, the main body including a second connector and a second portion extending from the second connector, the second end being devoid of the second portion; placing an outer plate against the first main body, the first end, the second main body, and the second end, the outer plate having a shape including a shape of the first portion, the first connector, the second portion, and the second connector; and placing one or more inner plates against the first end and the second end opposite the outer plate, the one or more inner plates including a first extension tab located against the first rail assembly and a second extension tab located against the second rail assembly.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Reference will now be made in detail to the example embodiments of this disclosure, which are illustrated in the accompanying drawings. Power distribution systems, including switchgears and switchboards, may distribute electric power to a plurality of different systems, locations, and devices. For example, an input of a power distribution system may be connected to a main power line, such as the main power line to a building. The power distribution systems may include circuits and the like that distribute power to a plurality of locations, such as different floors or areas in a building or to different pieces of heavy equipment. Current flow through power distribution systems may be several hundred amperes to 150$k$A or greater when undergoing a short circuit event. In some embodiments, the power distribution systems may monitor current flow to the different locations and may include circuit breakers to disconnect power to locations that draw current in excess of a predetermined threshold amperage.

Power distribution systems may be fabricated in panelized structures that may include a plurality of cabinet sections. The front of the panel structures may include user controls, such as circuit breakers, and/or monitoring devices. In order to conserve space in facilities, the interior of the power distribution systems may be densely packed with controls, buses, circuit breakers, and other components. Bus bars and splices (e.g., splice joints) that electrically and mechanically coupled the bus bars together may be accessible to users from behind front portions of the panel structures. Thus, locations of power distribution systems can be such that they enable user access solely through the front of the panel structures. Some embodiments of power distribution systems may include both front and rear access.

The power distribution systems may be fabricated in sections otherwise referred to as splits (e.g., shipping splits). Two or more shipping splits may be manufactured at an assembly plant and shipped to a final destination. The shipping splits may then be coupled together at the final destination to form a line-up, which constitutes a power distribution system. Bus bars spliced together are referred to as bus bar assemblies. Bus bars in the individual shipping splits may be spliced together when the individual shipping splits are located side-by-side. The splice locations may be within tight confines of the shipping splits, which makes accessing the splices very difficult. Other bus bars within the power distribution systems may also be spliced together.

Power distribution systems and splices for electrically and mechanically coupling bus bars together are disclosed herein in FIGS. 1-6. The configurations of power distribution systems and splices disclosed herein may enable users to splice bus bars within tight confines of power distribution systems.

Figure 1:
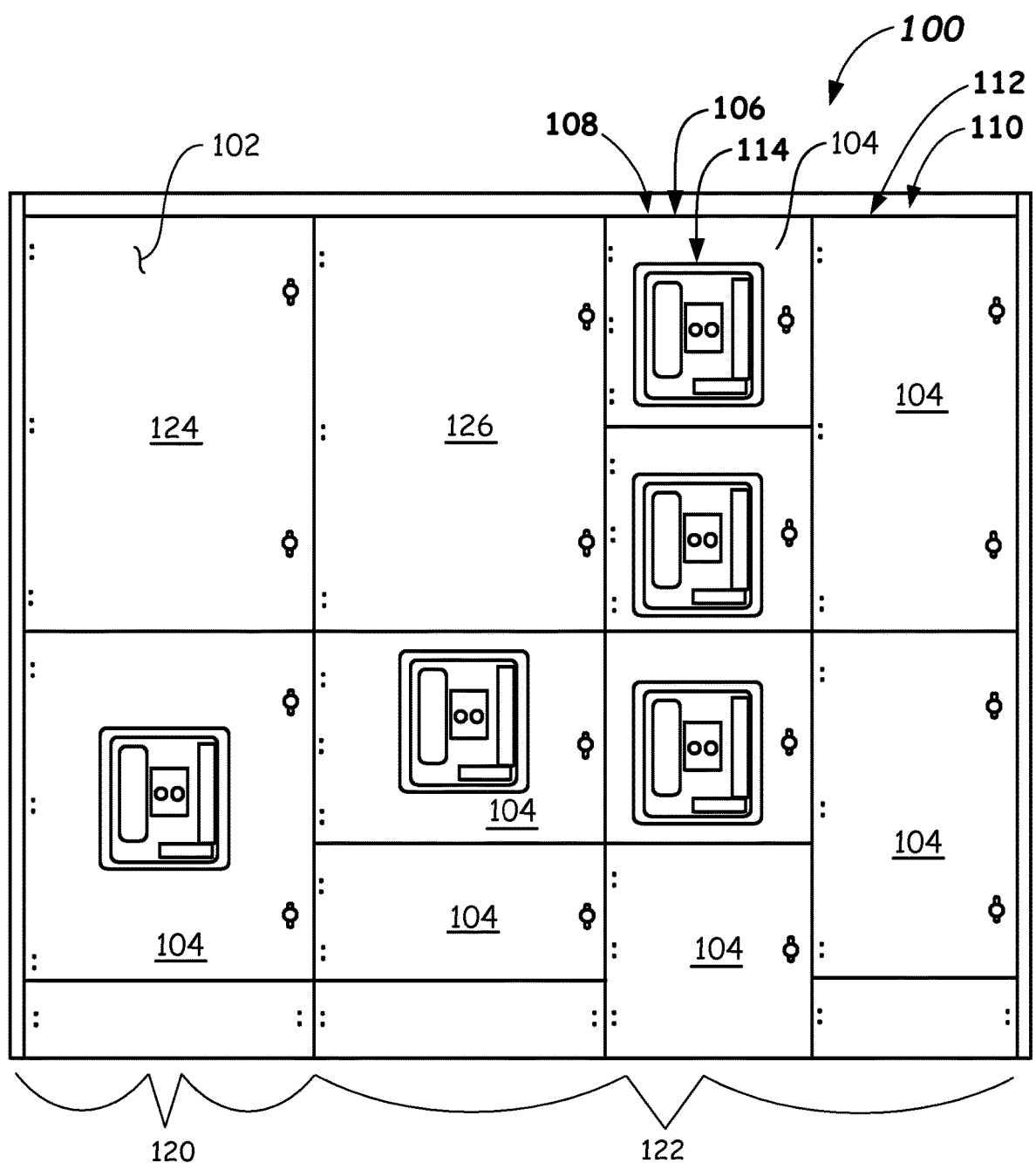
FIG. 1 illustrates a front elevation view of an exterior of a power distribution system (e.g., a switchgear or a switchboard) according to one or more embodiments of the disclosure.

Reference is now made to FIG. 1, which illustrates a front view of an embodiment of an assembled power distribution system 100. The power distribution system 100 may be a switchgear, switchboard, or the like. The power distribution system 100 may include a front surface 102 including a plurality of panels 104 (a few labeled). Panels as used herein means panelized structures and/or cabinet structures.

A first plurality of panels 106 may include user interfaces 114, which may include controls, such as circuit breakers and other controllers to control and monitor power distribution to different locations. The components within the first plurality of panels 106 may be collectively referred to as the circuit breaker section 108 and may electrically couple to the user interfaces 114.

A second plurality of panels 110 may contain terminal assemblies, buses, cables, and the like that electrically connect the power distribution system 100 to locations where power is distributed, such as locations in a building and power equipment. The second plurality of panels 110 may also contain buses (not shown) carrying line power and load power. These panels are collectively referred to as the cable pull section 112.

The power distribution system 100 may be fabricated at a manufacturing facility as a first shipping split 120 and a second shipping split 122. Other embodiments of the power distribution system 100 may include more than two shipping splits. The first shipping split 120 and the second shipping split 122 may be coupled together at the final destination of the power distribution system 100. In such a configuration, buses, bus bars, and/or rail assemblies in the first shipping split 120 may be spliced with buses, bus bars, and/or rail assemblies in the second shipping split 122. For example panel 124 and/or a panel 126 may be opened so that a user may access buses and conductors located between the first shipping split 120 and the second shipping split 122.

Figure 2:
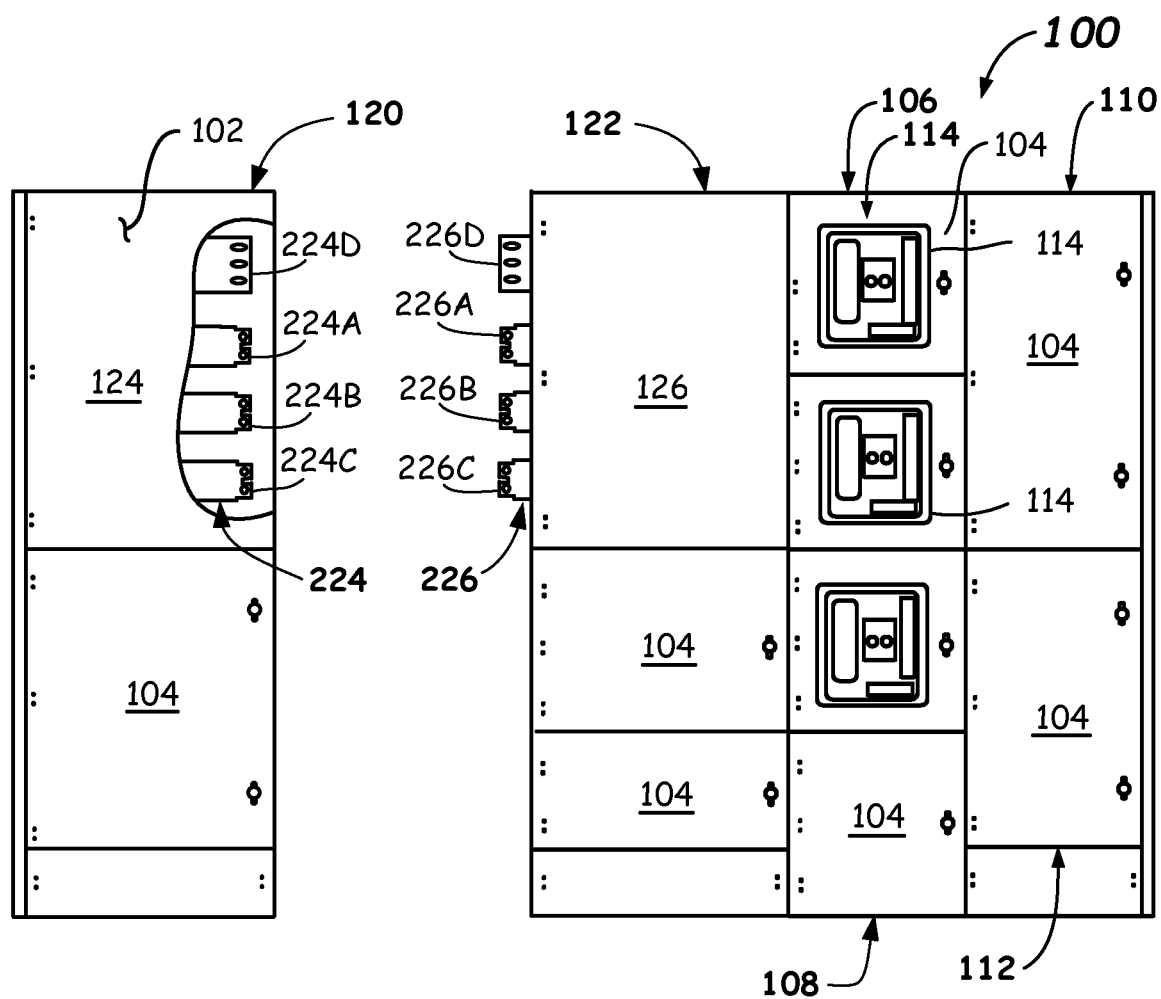
FIG. 2 illustrates a front elevation view of a power distribution system including a first shipping split separated from a second shipping split according to one or more embodiments of the disclosure.

Additional reference is made to FIG. 2, which illustrates the first shipping split 120 separated from the second shipping split 122. Both the first shipping split 120 and the second shipping split 122 may include bus bars, such as bus bars in a bus that splice together when the first shipping split 120 and the second shipping split 122 are connected together as shown in FIG. 1. In the embodiment shown in FIG. 2, the first shipping split 120 may include a first bus 224 including four bus bars 224A-224D. The second shipping split 122 may include a second bus 226 including four bus bars 226A-226D. The bus bars described herein may include single channel bus bars and/or dual channel bus bars. As described in greater detail below, single channel bus bars may include a single conductor or rail (e.g., a single channel) and dual channel bus bars may include two conductors or rails (e.g., two channels) that may be located side-by-side. The bus bar 224D and the bus bar 226D may be neutral lines.

Figure 3:
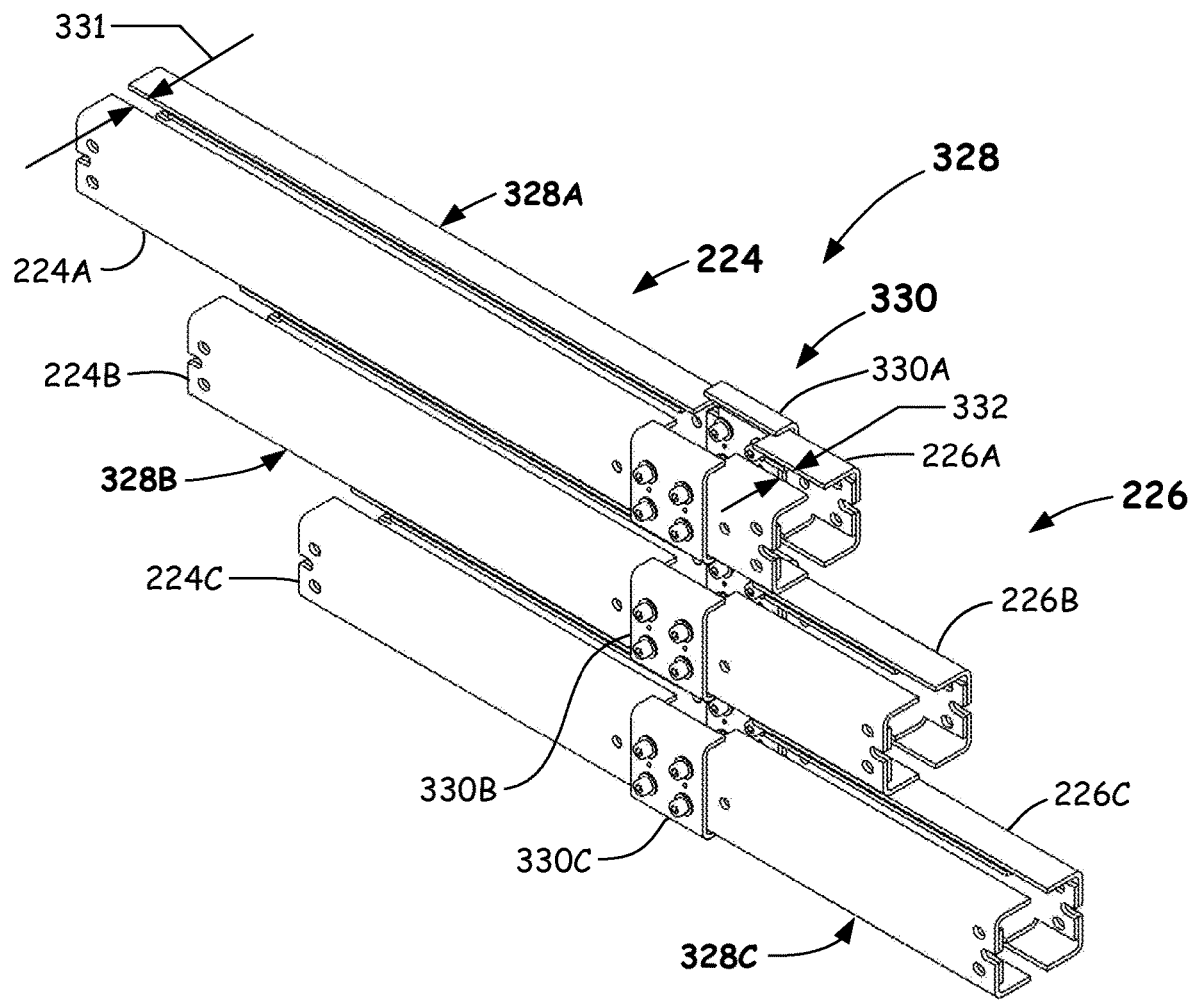
FIG. 3 illustrates a top isometric view of a first bus and a second bus spliced together to form bus bar assemblies according to one or more embodiments of the disclosure.

Reference is now made to FIG. 3, which illustrates an isometric view of the first bus 224 and the second bus 226 spliced together. Splices 330 may splice bus bars of the first bus 224 with corresponding bus bars of the second bus 226 to form a bus bar assemblies 328. For example, a first splice 330A may splice the first bus bar 224A of the first bus 224 with the first bus bar 226A of the second bus 226 to form a first bus bar assembly 328A. A second splice 330B may splice the second bus bar 224B of the first bus 224 with the second bus bar 226B of the second bus 226 to form a second bus bar assembly 328B. A third splice 330C may splice the third bus bar 224C of the first bus 224 with the third bus bar 226C of the second bus 226 to form a third bus bar assembly 328C. The splices 330 may provide for at least a constant cross-sectional area between the bus bars 224A-224C in the first bus 224 and the bus bars 226A-226C in the second bus 226 and through the splices 330. For example, the splices 330 may not cause reductions in the cross-sectional areas of the bus bar assemblies between the first bus 224 and the second bus 226.

Figure 4A:
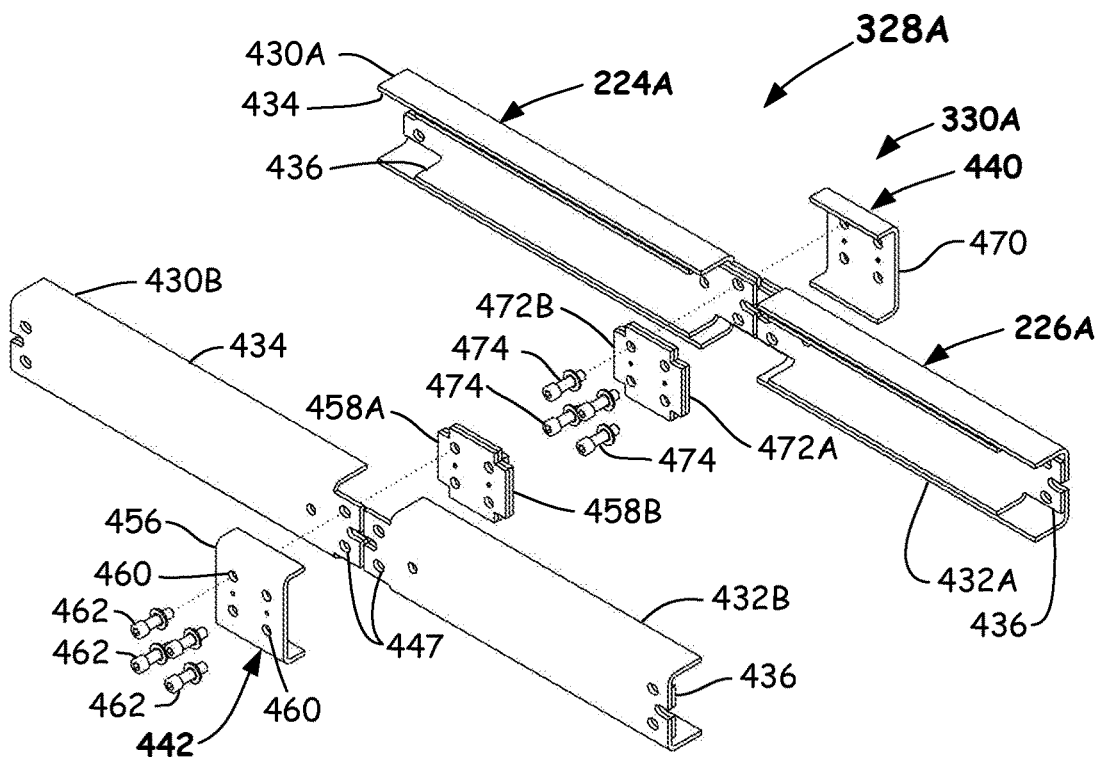
FIG. 4A illustrates an exploded view of bus bars including a first splice assembly and a second splice assembly according to one or more embodiments of the disclosure.

Reference is now made to FIG. 4A, which illustrates an exploded view of an embodiment of the first bus bar assembly 328A including the first bus bar 224A of the first bus 224 (FIG. 3), the first bus bar 226A of the second bus 226 (FIG. 3), and the first splice 330A. The first bus bar 224A and the first bus bar 226A may be dual channel bus bars. For example, the first bus bar 224A may include a first rail assembly 430A and a second rail assembly 430B separated by a gap (e.g., gap 331 FIG. 3), such as an air gap. The first bus bar 226A may include a first rail assembly 432A and a second rail assembly 432B separated by a gap (e.g., gap 332 FIG. 3), such as an air gap.

Figure 4B:
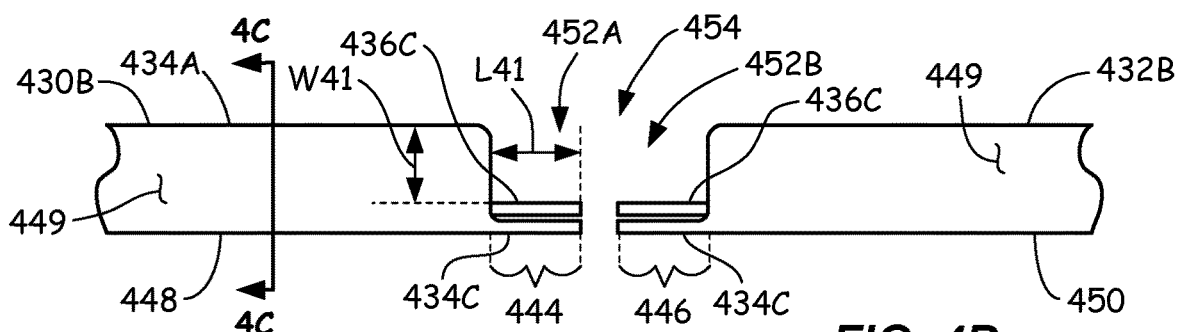
FIG. 4B illustrates a top plan view of rail assemblies of bus bars according to one or more embodiments.

Additional reference is made to FIG. 4B, which illustrates a top plan view of the second rail assembly 430B and the second rail assembly 432B. The first rail assembly 430A and the first rail assembly 432A may be identical or substantially similar to the second rail assembly 430B and the second rail assembly 432B, respectively. The second rail assembly 430B may include an end 444 and the second rail assembly 432B may include an end 446. The ends 444, 446 may be shaped different than main bodies 448, 450 of the second rail assemblies 430B, 432B in order to receive the second splice assembly 442. The ends 444, 446 may include holes 447 (a few labeled) configured to receive fasteners 462 (FIG. 4A).

Figure 4C:
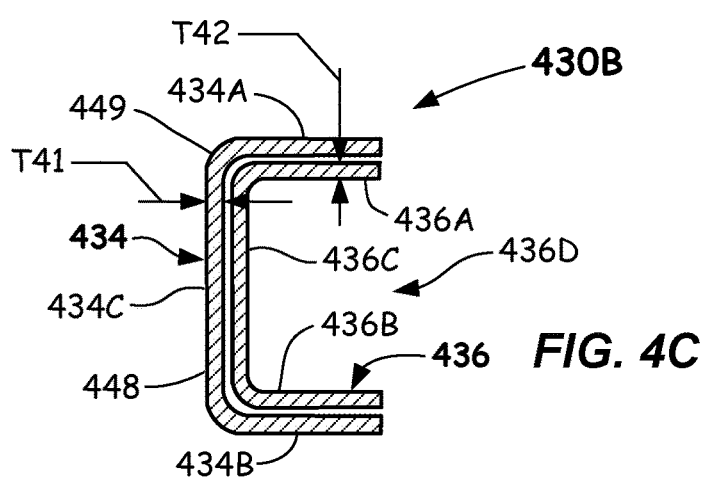
FIG. 4C illustrates a cross-sectional view of a rail assembly taken along section line 4C-4C of FIG. 4B according to one or more embodiments of the disclosure.

In some embodiments, the rail assemblies 430A, 430B, 432A, and 432B may include multiple conductors or rails. Reference is made to FIG. 4C, which illustrates a cross-sectional view of the main body 448 of the second rail assembly 430B and is representative of cross-sections of the other rail assemblies 430A, 432A, and 432B. The second rail assembly 430B may include an outer rail 434 and an inner rail 436. The outer rail 434 may include a first portion 434A, a second portion 434B, and a connector 434C coupled to both the first portion 434A and the second portion 434B. The first portion 434A and the second portion 434B may be parallel or substantially parallel. The outer rail 434 may be substantially C-shaped and the portions 434A, 434B, and the connector 434C may form a concave region where the inner rail 436 may be located. The outer rail 434 may have an outer surface 449 that has a shape and/or contour, such as a C-shape. The outer surface 449 may be the same shape as at least one portion of the second splice assembly 442 as described below. All the rail assemblies 430A, 430B, 432A, and 432B may have the same or different shapes on their outer surfaces.

The inner rail 436 may include a first portion 436A, a second portion 436B, and a connector 436C extending between the first portion 436A and the second portion 436B. The inner rail 436 may be C-shaped and may have the same or substantially the same contours as the outer rail 434. The shape of the outer rail 434 and the inner rail 436 may enable the inner rail 436 to fit within the outer rail 434, such as within the concave region of the outer rail. The inner rail 436 may include a concave region 436D. In other embodiments, the inner rail 436 may be flat, such as being solely the connector 436C, and may be located against the connector 434C of the outer rail 434.

The outer rail 434 may have a thickness T41. The inner rail 436 may have a thickness T42, which may be equal to the thickness T41. The ends 444, 446 of the rail assemblies 430A, 430B, 432A, and 430B may have thicknesses equal to or substantially (e.g., within 15%) of one or both the thicknesses T41 and T42. A gap is shown between the outer rail 434 and the inner rail 436. In some embodiments, this gap does not exist. For example, the outer rail 434 and the inner rail 436 may contact each other.

Referring again to FIG. 4B, the ends 444, 446 may not include the first portions 434A, 436A and/or the second portions 434B, 436B. Accordingly, the ends 444, 446 may only include the connectors 434C, 436C. The absence of the first portions 434A, 436A and/or the second portions 434B, 434B may form gaps 452A, 452B in the ends 444, 446 of the rail assemblies 430A, 430B. The gaps 452A, 452B may form a combined gap 454. The gaps 452A, 452B, 454 may provide user access to the first splice 330A during assembly as described in detail below.

The gap 452A, which may be identical or substantially similar to the gap 452B, may have a length L41 and a width W41. In some embodiments, both the length L41 and the width W41 may be between one inch and 2.5 inches (2.54 cm and 6.35 cm). The second rail assemblies 430B, 432B may be separated by about 0.5 inches (1.27 cm), so the combined gap 454 may have a width between one inch and 2.5 inches (2.54 cm and 6.35 cm) and a length between 2.5 inches and 5.5 inches (6.35 cm and 14 cm).

The first splice 330A may include a first splice assembly 440 and a second splice assembly 442. The first splice assembly 440 may splice the first rail assembly 430A and the first rail assembly 432A together. The second splice assembly 442 may splice the second rail assembly 430B and the second rail assembly 432B together.

Figure 4D:
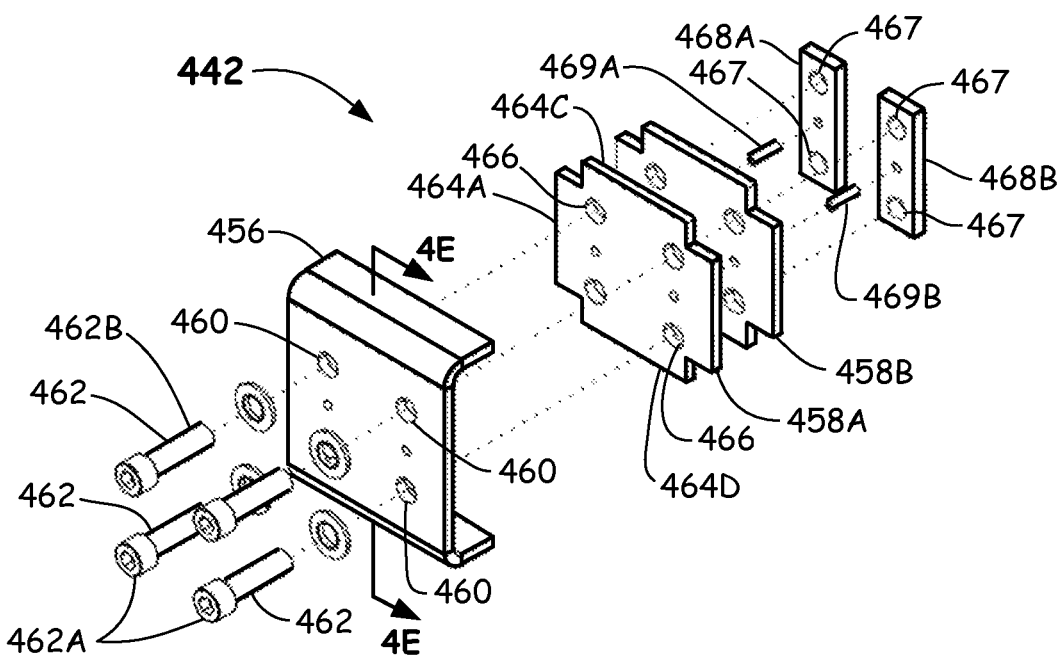
FIG. 4D illustrates an exploded view of a splice assembly according to one or more embodiments of the disclosure.

Reference is made to FIG. 4D, which illustrates an exploded view of the second splice assembly 442, which may include identical or substantially similar components as the first splice assembly 440. The first splice assembly 440 may include an outer plate 456 and one or more inner plates. The embodiment depicted in FIG. 4D may include a first inner plate 458A and a second inner plate 458B. In some embodiments, the first splice assembly 440 may include a single inner plate (not shown). In some embodiments, the single inner plate may have about the same thickness as the combination of the first inner plate 458A and the second inner plate 458B.

Figure 4E:
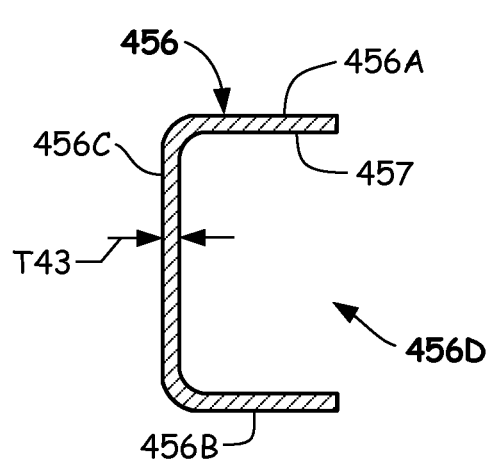
FIG. 4E illustrates a side cross-sectional view of an outer plate of a splice assembly taken along section line 4E-4E of FIG. 4D according to one or more embodiments of the disclosure.

Reference is now made to FIG. 4E, which illustrates a side, cross-sectional view of the outer plate 456. The outer plate 456 may be C-shaped and/or have a shape the same as or substantially the same as the outer rail 434 (FIG. 4C). For example, the outer plate 456 may have a shape that matches or at least partially matches the outer surface 449 of the outer rail 434. The outer plate 456 may include a first portion 456A and a second portion 456B joined by a connector 456C. The first portion 456A, second portion 456B, and connector 456C may form a concave region 456D having an inner surface 457. The inner surface 457 may have a shape and/or contour that is the same as or substantially similar to the outer surface 449 of the outer rail 434. The configuration of the outer plate 456 may have a shape that matches or at least partially matches the outer surface of the outer rail 434. The term "at least partially matches" includes shapes that may be nested or partially nested within each other, such as the C-shapes of the outer plate 456 and the outer rail 434. Components that have shapes that at least partially match each other include contact areas that enable current flow between the components. For example, the outer plate 456 may fit over the outer rail 434 such that at least some areas of the inner surface 457 of the outer plate 456 contacts the at least some areas of the outer surface 449 of the outer rail 434. The contact may provide for current flow between the outer rail 434 and the outer plate 456. All portions of the outer plate 456 may have a thickness T43. In some embodiments, the thicknesses T41, T42, and T43 are all equal.

The outer plate 456 may include one or more holes 460 configured and sized to receive one or more fasteners 462. In the embodiment of FIG. 4D, the outer plate 456 includes four holes 460 configured to receive four fasteners 462. The fasteners 462 may be screws having heads 462A and shafts 462B. All the fasteners 462, 474 in the first splice 330A (FIG. 4A) may extend in the same direction. For example, all the shafts may extend in the same direction relative to their heads.

Figure 4F:
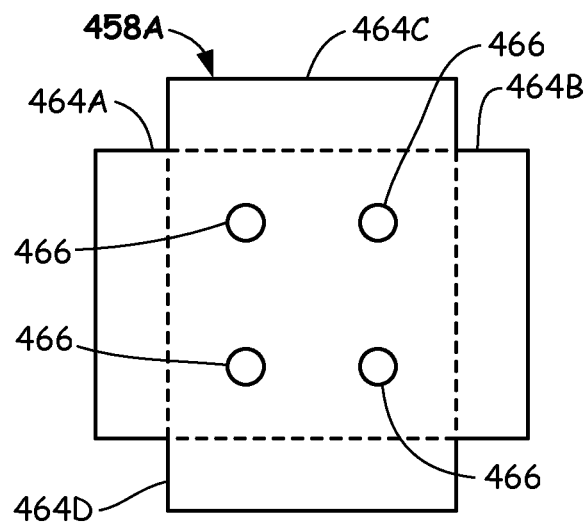
FIG. 4F illustrates a plan view of an inner plate of a splice assembly according to one or more embodiments of the disclosure.

FIG. 4F illustrates a front elevation view of the first inner plate 458A, which may be identical to the second inner plate 458B. The first inner plate 458A may be square or rectangular as indicated by the dashed lines. The first inner plate 458A may have other shapes. The first inner plate 458A may include one or more extension tabs that may extend from the dashed lines marking the square or rectangular portion of the first inner plate 458A. The first inner plate 458A depicted in FIG. 4F includes four extension tabs 464A-464D. The extension tab 464A may extend in an opposite direction relative to the extension tab 464B and the extension tab 464C may extend in an opposite direction relative to the extension tab 464D. For reference purposes, the extension tabs 464A and 464B may be referred to as extending in a horizontal direction and the extension tabs 464C and 464D may be referred to as extending in a vertical direction. The extension tabs 464A and 464B may extend along the inner rails 436 of the second rail assemblies 430B, 432B. The extension tabs 464A-464D may maintain the cross-sectional area of the second rail assemblies 430B, 432B across the second splice assembly 442. In some embodiments, a thickness (not shown) of the first inner plate 458A may be within 15% of either thickness T41 or T42.

The first inner plate 458A may include one or more holes sized and/or configured to receive the one or more fasteners 462. In the embodiment of FIG. 4F, the first inner plate 458A may include four holes 466 that may form a hole pattern that is the same as a hole pattern formed by the holes 460. Accordingly, the fasteners 462 may pass through the holes 460 and the holes 466.

One or more fastener receivers (e.g., nut plates 468A, 468B) may be located to receive the fasteners 462 so as to secure the outer plate 456 and the inner plates 458A, 458B. The embodiment of the second splice assembly 442 includes the nut plates 468A, 468B adjacent the second inner plate 458B. In some embodiments, the nut plates 468A, 468B are nuts or nut plates that receive threaded fasteners 462. The embodiment of FIG. 4D includes a first nut plate 468A and a second nut plate 468B. Each nut plate 468A, 468B may include two holes 467 that receive the fasteners 462. In embodiments where the fasteners 462 and the nut plates 468A, 468B are threaded, the use of two holes 467 in each of the nut plates 468A, 468B prevents the nut plates 468A, 468B from rotating and loosening the fasteners 462. Pins 469A, 469B may secure the nut plates 468A, 468B to the second inner plate 458B to hold the nut plates 468A, 468B in place before the fasteners 462 are installed.

The first splice assembly 440 may include components that are identical or substantially similar to the components of the second splice assembly 442 described above. For example, the first splice assembly 440 may include an outer plate 470, a first inner plate 472A, a second inner plate 472B, and fasteners 474. Nut plates (not shown) may be located behind the outer plate 470, which enable fasteners 474 and 460 to extend in the same direction.

Figure 5A:
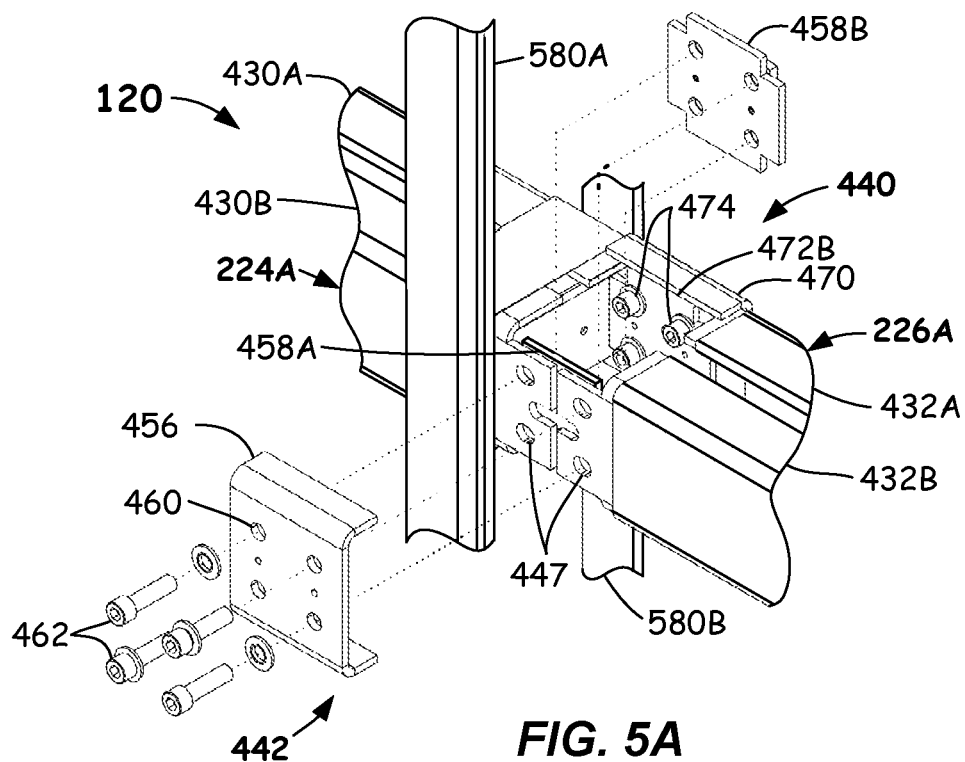
FIG. 5A illustrates an isometric view of a partially assembled splice according to one or more embodiments of the disclosure.
Figure 5B:
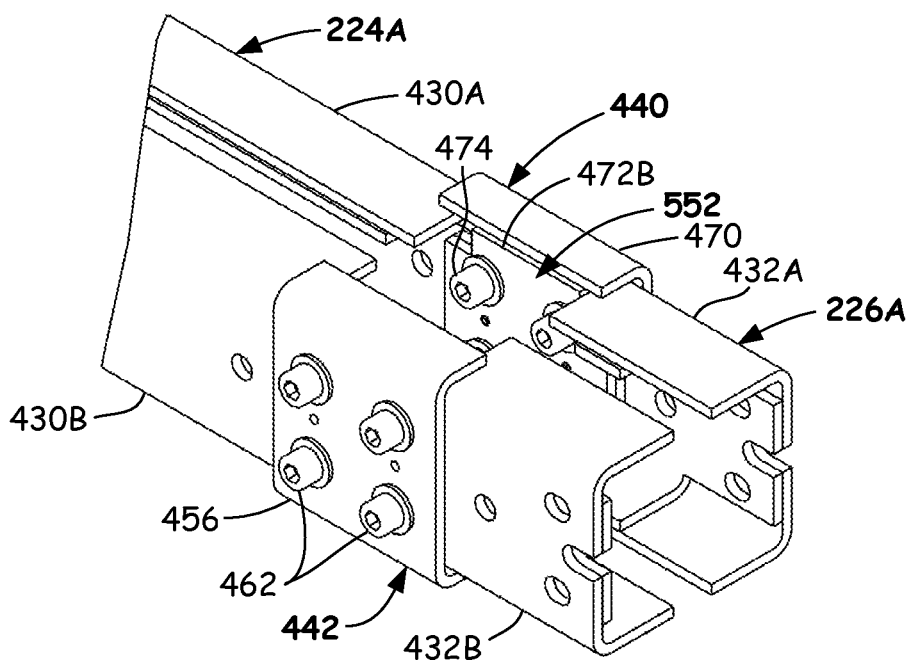
FIG. 5B illustrates an isometric view of an assembled splice according to one or more embodiments of the disclosure.
Figure 6:
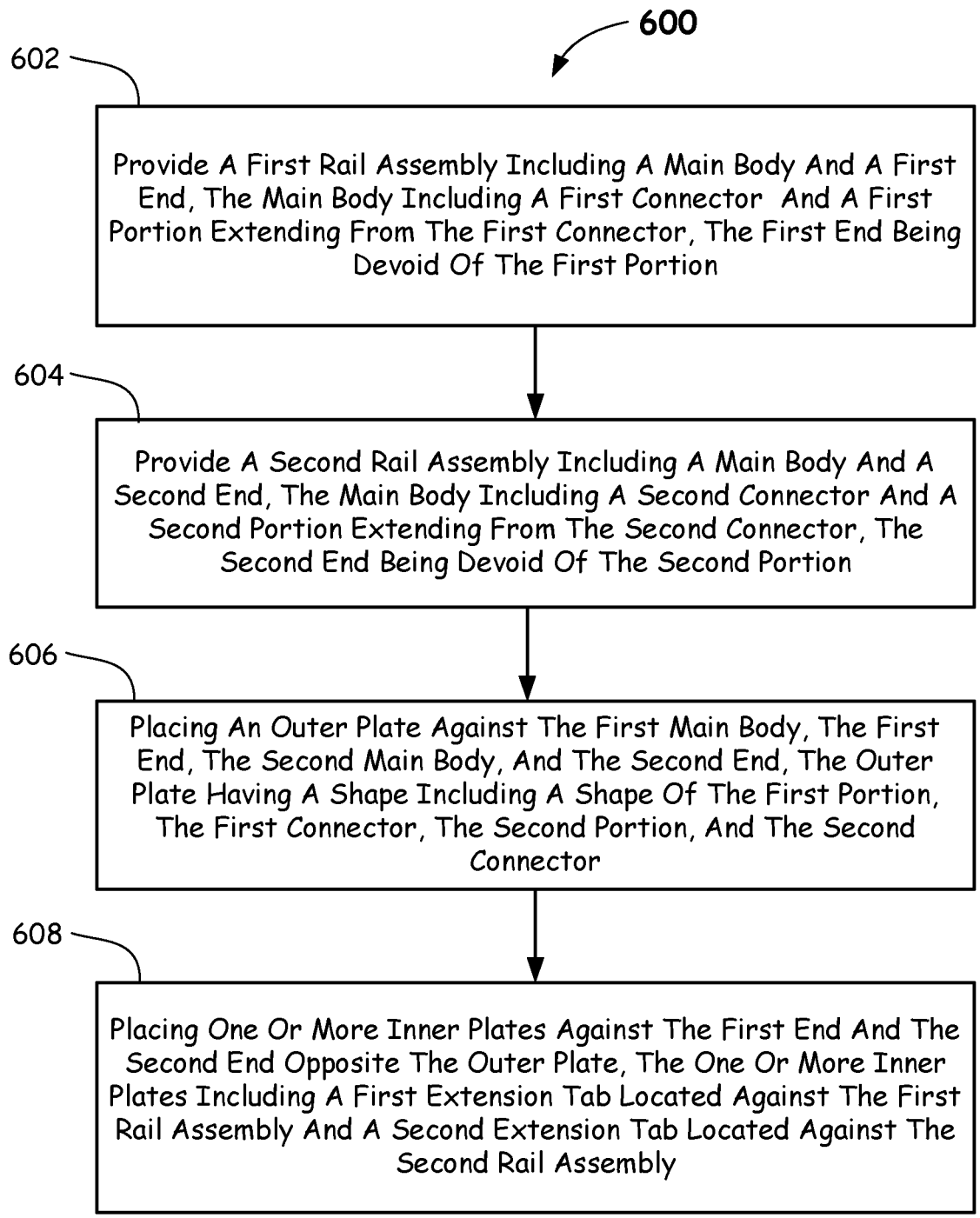
FIG. 6 illustrates a flowchart describing a method of splicing a first rail assembly of a first bus bar to a second rail assembly of a second bus bar according to one or more embodiments of the disclosure.

Reference is now made to FIG. 5A, which illustrates the first splice 330A in a partially assembled configuration and FIG. 5B, which illustrates the first splice 330A in a fully assembled configuration. The view of FIG. 5A includes a first brace 580A and a second brace 580B that may secure the first bus bar 224A to other bus bars in the first bus 224 (FIG. 3). A user may access portions of the first splice assembly 440 through a gap 552 formed between the first bus bar 224A and the first bus bar 226A. For example, a user may finger tighten the fasteners 474 by accessing the fasteners 474 through the gap 552. The gap 552 may be formed by at least the combined gap 454 in the second rail assemblies 430B, 432B and a similar gap in the first rail assemblies 430A, 432A.

A user may also access the fasteners 474 though the holes 447. For example a wrench (e.g., an Allen wrench) may be passed through the holes 447 to torque or otherwise tighten the fasteners 474. In the embodiment of FIGS. 5A and 5B, the fasteners 462 and 474 all face the same direction, which enables the first splice 330A to be applied from a single side of the first bus 224 (FIG. 3). Nut plates may be attached to the far side of the outer plate 470, so a user does not have to hold nuts or the like while tightening the fasteners 474.

After the first splice assembly 440 assembly has been installed, the second splice assembly 442 may be installed. The installation method may include locating the first inner plate 458A against the connector 436C of both the second rail assemblies 430B and 432. The second inner plate 458B may then be placed against the first inner plate 458A. A user may hold both the second inner plate 458B and the first inner plate 458A through the gap 552. The outer plate 456 may then be placed against the outer surfaces 449 of the second rail assemblies 430B, 432B. For example, portion of the outer plate 456 may contact a portion of the main body 448 of the second rail assembly 430B and another portion of the outer plate 456 may contact a portion of the main body 450 of the second rail assembly 432B. In such a configuration, the outer surfaces 449 of the second rail assemblies 430B, 432B may electrically connect with the inner surface 457 (FIG. 4E) of the outer plate 456. The fasteners 462 may be passed through the holes 460, 447, and 466 and into the nut plates 468A, 468B to yield the assembled first splice 330A as shown in FIG. 5B. The nut plates 468A, 468B may be secured to the second inner plate 458B, so a user may not have to hold a nut as the fasteners are tightened.

The splices 330 (FIG. 3) provide at least a constant cross-sectional area between the bus bars 224A-224C (FIG. 2) in the first bus 224 and the bus bars 226A-226C in the second bus 226. For example, the cross-section area as measured from the first bus 224, through the splices 330, and into the second bus 226 does not diminish, such as through the splices 330. The constant or non-diminishing area may be accomplished by at least two inner plates 458A, 458B and the extension tabs 464A, 464B contacting at least the inner rails 436 of the rail assemblies 430A, 430B, 432A, 432B, which provides increased surface area and cross-sectional width. The extension tabs 464C, 464D further increase the contact surface and cross-sectional width of the splices 330. For example, the extension tabs 464C, 464D may extend past the outer rail 434 or past the connector 434C and close to the inner surface 457 of the outer plate 456. Accordingly, the distance between the extension tabs 464C and 464D may be longer than the length of the connector 434C of the outer rail 434. In addition, the inner surfaces 457 of the outer plates 456 conform to the outer surfaces 449 of the rail assemblies 430A, 430B, 432A, and 432B, which increases the surface contacts and cross-sectional areas of the splices 330.

Some embodiments may include bus bar assemblies including a single rail. For example, referring to FIG. 4C, these embodiments may include just the outer rail 434 and not the inner rail 436. The main bodies of these rail assemblies may have lower cross-sectional areas, so they may only include a single inner plate, such as just one of the inner plates 458A, 458B. The single inner plate combined with the outer plate 456 may at least maintain the cross-sectional area of the bus bars 224A and 224B across the splice when the bus bars 224A and 226A include a single rail (e.g., inner rail 436 or outer rail 434). In some embodiments, all cross-sectional areas of the first splice 330A are at least equal to cross-sectional areas of the main bodies of one or both of the first bus bar 224A and the first bus bar 226A.

In another aspect, a method of splicing a first rail assembly (e.g., rail assembly 430A) of a first bus bar (e.g., first bus bar 224A) to a second rail assembly (e.g., rail assembly 432A) of a second bus bar (e.g., bus bar 226A) is disclosed. The method is described in the flowchart 600 of FIG. 6. The method may include, in 602, providing a first rail assembly including a main body (e.g., main body 448) and a first end (e.g., end 444), the main body including a first connector (e.g., connector 434C) and a first portion (e.g., portion 434A) extending from the first connector, the first end being devoid of the first portion. The method may include, in 604, providing a second rail assembly (e.g., rail assembly 432A) including a main body (e.g., main body 450) and a second end (e.g., end 446), the main body including a second connector and a second portion extending from the second connector, the second end being devoid of the second portion. The method may include, in 606, placing an outer plate (e.g., outer plate 456) against the first main body, the first end, the second main body, and the second end, the outer plate having a shape including a shape of the first portion, the first connector, the second portion, and the second connector. The method may include, in 608 placing one or more inner plates (e.g., inner plates 458A, 458B) against the first end and the second end opposite the outer plate, the one or more inner plates including a first extension tab (e.g., extension tab 464A) located against the first rail assembly and a second extension tab (e.g., extension tab 464B) located against the second rail assembly.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limiting to the particular apparatus, assemblies, systems and/or methods disclosed, but, to the contrary, the intention is to cover all modifications, equivalents, and alternatives falling within the scope of the claims.

What is claimed is:

1. A bus bar assembly, comprising:
a first rail assembly having a first end and an adjacent first main body, the first main body having a first outer shape;
a second rail assembly having a second end and an adjacent second main body, the second main body having a second outer shape;
a first splice splicing the first end to the second end, the first splice comprising:
a first outer plate having a shape that at least partially matches the first outer shape and the second outer shape, a portion of the first outer plate adjacent the first main body and a portion of the first outer plate adjacent the second main body, and
one or more inner plates, each of the one or more inner plates having two or more extension tabs, wherein a first extension tab is adjacent the first rail assembly and a second extension tab is adjacent the second rail assembly;
one or more first fasteners extending through the first outer plate, the first end, and the one or more inner plates; and
one or more second fasteners extending through the first outer plate, the second end, and the one or more inner plates.

2. The bus bar assembly of claim 1, further comprising one or more fastener receivers wherein the one or more first fasteners and the one or more second fasteners are received in the one or more fastener receivers.

3. The bus bar assembly of claim 1, wherein:
the first main body includes a first portion and a connector attached thereto, wherein the first end is devoid of the first portion,
the second main body includes a first portion and a connector attached thereto, wherein the second end is devoid of the first portion, and
a gap is present in the first end and the second end wherein the first end and the second end of the first main body and of the second main body are devoid of the first portions.

4. The bus bar assembly of claim 1, wherein the first rail assembly includes two or more rails and the second rail assembly includes two or more rails.

5. The bus bar assembly of claim 4, wherein a number of inner plates is equal to a number of inner rails in the first rail assembly.

6. The bus bar assembly of claim 1, wherein a cross-sectional area of the first rail assembly is at least equal to a cross-sectional area of the one or more inner plates and outer plate.

7. The bus bar assembly of claim 1, wherein all cross-sectional areas of the first splice are at least equal to a cross-sectional area of the main body of the first rail assembly.

8. The bus bar assembly of claim 1, wherein all cross-sectional areas of the first splice are at least equal to a cross-sectional area of the main body of the second rail assembly.

9. The bus bar assembly of claim 1, wherein the first outer plate includes a first portion and a second portion extending from a connector, the first portion and the second portion being at least partially parallel.

10. The bus bar assembly of claim 1, further comprising:
a third rail assembly having a third end and an adjacent third main body, the third main body having a third outer shape;
a fourth rail assembly having a fourth end and an adjacent fourth main body, the fourth main body having a fourth outer shape; and
a second splice splicing the third end to the fourth end.

11. The bus bar assembly of claim 10, wherein the second splice comprises:
a second outer plate having a shape that at least partially matches the third outer shape and the fourth outer shape, a portion of the second outer plate adjacent the third main body and a portion of the second outer plate adjacent the fourth main body;
one or more second inner plates, each of the one or more second inner plates having two or more extension tabs, wherein a first extension tab is adjacent the third rail assembly and a second extension tab is adjacent the fourth rail assembly;

one or more third fasteners extending through the second outer plate, the first end, and the one or more second inner plates; and one or more fourth fasteners extending through the second outer plate, the second end, and the one or more second inner plates.

12. The bus bar assembly of claim 11, wherein the third rail assembly and the fourth rail assembly include an equal number of two or more rails, and wherein a number of second inner plates is equal to a number of rails in the third rail assembly and the fourth rail assembly.

13. The bus bar assembly of claim 11,
wherein the first fasteners, the second fasteners, the third fasteners, and the fourth fasteners have heads on at one end and shafts, and all the shafts extend in a same direction relative to the heads.

14. A power distribution system comprising:
a bus comprising one or more bus bar assemblies configured to conduct current within the power distribution system, one or more of the bus bar assemblies comprising:
  a first rail assembly having a first end and an adjacent first main body, the first main body having a first outer shape;
  a second rail assembly having a second end and an adjacent second main body, the second main body having a second outer shape,
  a first splice splicing the first end to the second end, the first splice comprising:
    a first outer plate having a shape that at least partially matches the first outer shape and the second outer shape, a portion of the first outer plate adjacent the first main body and a portion of the first outer plate adjacent the second main body, and
    one or more first inner plates, each of the one or more first inner plates having two or more extension tabs, wherein a first extension tab is adjacent the first rail assembly and a second extension tab is adjacent the second rail assembly;
  one or more first fasteners extending through the first outer plate, the first end, and the one or more first inner plates; and
  one or more second fasteners extending through the first outer plate, the second end, and the one or more first inner plates,
  wherein the one or more first fasteners and the one or more second fasteners have heads and all extend in a same direction relative to the heads.

15. The power distribution system of claim 14, wherein the one or more bus bar assemblies further comprise:
  a third rail assembly having a third end and an adjacent a third main body, the third main body having a third outer shape;
  a fourth rail assembly having a fourth end and an adjacent fourth main body, the fourth main body having a fourth outer shape; and
  a second splice splicing the third end to the fourth end, the second splice including a second outer plate and one or more second inner plates.

16. A method of splicing a first rail assembly of a first bus bar to a second rail assembly of a second bus bar, the method comprising:
  providing a first rail assembly including a main body and a first end, the main body including a first connector and a first portion extending from the first connector, the first end being devoid of the first portion;
  providing a second rail assembly including a main body and a second end, the main body including a second connector and a second portion extending from the second connector, the second end being devoid of the second portion;
  placing an outer plate against the first main body, the first end, the second main body, and the second end, the outer plate having a shape including a shape of the first portion, the first connector, the second portion, and the second connector;
  placing one or more inner plates against the first end and the second end opposite the outer plate, the one or more inner plates including a first extension tab located against the first rail assembly and a second extension tab located against the second rail assembly;
  providing a one or more fastener receivers; and
  placing one or more fasteners through the outer plate, the first end, and the one or more inner plates, wherein the one or more fasteners are received by the one or more fastener receivers.

17. The method of claim 16, wherein the first rail assembly and the second rail assembly include an equal number of two or more rails, and wherein placing one or more inner plates comprises placing a number of inner plates equal to the number of rails against the first end and the second end opposite the outer plate.

* * * * *